United States Patent

[11] 3,600,682

[72] Inventors Kouichi Yoshimoto; Susumu Kitazume, both of Tokyo, Japan
[21] Appl. No. 824,059
[22] Filed May 13, 1969
[45] Patented Aug. 17, 1971
[73] Assignee Nippon Electric Company, Limited Tokyo, Japan
[32] Priority May 14, 1968
[33] Japan
[31] 43/32391

[54] MICROWAVE POWER AMPLIFIER NETWORKS INCLUDING SWITCHING ARRANGEMENTS THEREFOR
11 Claims, 5 Drawing Figs.

[52] U.S. Cl. .... 325/168, 325/3, 325/101, 179/15 R, 330/124, 333/7, 343/207
[51] Int. Cl. .... H04b 1/04
[50] Field of Search .... 325/2, 3, 152, 154, 156—158, 168, 101; 178/6 PD; 179/15; 330/124; 333/3, 7; 343/207, 208

[56] References Cited

UNITED STATES PATENTS

| | | | |
|---|---|---|---|
| 2,740,838 | 4/1956 | Pierce | 325/3 |
| 2,914,671 | 11/1959 | De Lange | 333/7 |
| 2,934,658 | 4/1960 | Lewis | 333/7 |
| 3,032,723 | 5/1962 | Ring | 333/7 |
| 3,065,420 | 11/1962 | Close | 325/3 |

*Primary Examiner*—Robert L. Griffin
*Assistant Examiner*—Albert J. Mayer
*Attorney*—Marn & Jangarathis

ABSTRACT: Multiplex signals are interconnected to two high-power amplifiers with microwave switches and hybrids in an arrangement so that each amplifier can selectively handle the signals of the other amplifier in case of failure of one of the amplifiers.

INVENTORS
Kouichi Yoshimoto
Susumu Kitazume

BY Marn & Jangarathis
ATTORNEYS

INVENTORS
Kouichi Yoshimoto
Susumu Kitazume
BY
Marn & Jangarathis
ATTORNEYS

MICROWAVE POWER AMPLIFIER NETWORKS INCLUDING SWITCHING ARRANGEMENTS THEREFOR

This invention relates to microwave power amplifier networks including switching arrangements and more particularly to microwave power amplifier networks which include fail safe switching arrangements for use in the transmitting stations of communications systems.

In communications systems requiring large amounts of transmitting power, microwave power amplifier means, capable of supplying the requisite power, are often employed in network configurations which provide a 100 percent standby arrangement within the transmitting stations of such communications systems so that secondary, independent power amplifier means are immediately available for use upon the failure of the primary power amplifier means. Thus, in satellite communications systems, for instance, the microwave power amplifier means present in the ground stations thereof are arranged in a network configuration providing 100 percent standby power wherein one regular signal route, including at least a first microwave power amplifier means, and one standby or spare signal route, including at least a second microwave power amplifier means, are provided so that upon the failure of the first microwave power amplifier means in the regular signal route, power may be supplied to the transmitting antenna by the second microwave power amplifier means present in the standby signal route. One such microwave power amplifier network which is frequently relied upon when television and multiplexed telephony signals are to be transmitted is the so called " hot standby system." In this microwave power amplifier network, television signals and multiplexed telephony signals are each applied in parallel to both a regular and a standby signal route and thus, in parallel to first and second microwave power amplifier means present therein to provide the requisite standby arrangement. Therefore, under normal operating conditions, the requisite power and information is continuously available from each of said regular and standby signal routes and said regular signal route supplies such power and information to the transmitting antenna; however, upon the detection of a failure in the first microwave power amplifier means present in the regular signal route, power and information is supplied to said transmitting antenna from the standby signal route and the second microwave power amplifier means present therein.

The above-described microwave power amplifier networks relied upon to supply 100 percent standby power are provided with switching arrangements associated with each of said regular and standby signal routes so that two discrete signal paths are alternately available for the application of power and information to the transmitting antenna. Such switching arrangements thereby act upon the detection of a failure in the first microwave power amplifier means, to connect the output of the second microwave power amplifier means to the transmitting antenna and to disconnect the output of the first microwave power amplifier means therefrom; while, when the normal operating condition of the first microwave power amplifier means is restored, said switching arrangements act to reestablish the connection of the output to the transmitting antenna of said first microwave power amplifier means and to disconnect the output of the second microwave power amplifier means therefrom. In addition, where television and multiplexed telephony signals are each supplied to each of said regular and standby signal routes in parallel, such switching arrangements also function as a portion of the input circuitry for the first and second microwave power amplifier means present in such regular and standby signal routes, respectively, so that the television and multiplexed telephony signals applied to each of said first and second microwave power amplifier means may be selectively interchanged. The switching arrangements thus present in such microwave power amplifier networks and particularly those utilized in satellite communications systems must, of necessity, act in a manner to enable television and multiplexed telephony signals to be transmitted simultaneously and accordingly must appropriately prepare the regular and standby signal routes to receive such signals. Furthermore, as it is generally desirable that the return of a microwave power amplifier means to a normal operating condition from a failed condition be detected and confirmed with television and/or multiplexed telephony signals which are not to be transmitted, the switching arrangements present in such microwave power amplifier networks preferably provide television and/or multiplexed telephony signals which are not to be transmitted to the regular signal route even when the microwave power amplifier means present therein has failed.

Although the conventional microwave power amplifier networks described above act appropriately to provide a 100 percent standby arrangement, it will be apparent that the standby arrangements thus formed are highly expensive to operate because the power provided in the standby signal route by the second microwave amplifier means is completely wasted during such time intervals as the first microwave power amplifier means in the regular signal route is operating normally. Furthermore, in satellite communications systems, the intermodulation noise due to the nonlinearity of the microwave power amplifier means substantially increases with an increase in the number of signals to be commonly amplified by a given one of said microwave power amplifier means. Thus, when one of said microwave power amplifier means is acting upon more than a single type of signal, the power saturation level of such microwave power amplifier means should be high. However, as increases in the values of power saturation are necessarily limited in such microwave power amplifier means, intermodulation noise cannot be sufficiently reduced to a level which ensures that such intermodulation noise will not affect the operation of communications systems employing these conventional microwave power amplifier networks.

Therefore, it is an object of this invention to provide microwave power amplifier networks for communications systems wherein the intermodulation noise is substantially reduced and the transmission quality of the communications system is thereby increased.

A further object of the present invention is to provide microwave power amplifier networks, including the switching arrangements therefor, which are highly efficient in operation.

An additional object of the present invention is to provide microwave power amplifier networks including regular and standby microwave power amplifier means wherein when said regular microwave power amplifier means are functioning normally, both said regular and standby microwave power amplifier means are utilized whereby intermodulation noise is substantially reduced and operating efficiency is markedly increased.

Another object of the present invention is to provide microwave power amplifier networks for satellite communications systems wherein television and multiplexed telephony signals are simultaneously transmitted, said microwave power amplifier networks including regular and standby signal routes and switching arrangements for preparing said regular and standby signal routes for the receipt of said television and multiplexed telephony signals.

A further object of the present invention is to provide microwave power amplifier networks for communications systems including regular and standby microwave power amplifier means wherein the return of one of said microwave power amplifier means present therein to a normal operating condition from a failed operating condition may be determined with a signal not to be transmitted by said communications system.

Other objects and advantages of the present invention will become clear from the following detailed description of several embodiments thereof, and the novel features will be particularly pointed out in conjunction with the appended claims.

In accordance with this invention, microwave power amplifier networks for communications systems are provided wherein each such microwave power amplifier network includes first and second microwave power amplifier means exhibiting a sufficient bandwidth to accommodate first and second multiplexed signals, switching means adapted to separately apply said first multiplexed signal to one of said microwave power amplifier means and said second multiplexed signal to another of said microwave power amplifier means, means adapted to apply each of said first and second multiplexed signals to one of said microwave power amplifier means in response to the detection of a failure in said another of said microwave power amplifier means, and means for selectively applying the outputs of said first and second microwave power amplifier means to transmitting antenna means.

The invention will be more clearly understood by reference to the following detailed description of several embodiments thereof in conjunction with the accompanying drawings, in which.

Figure 1:
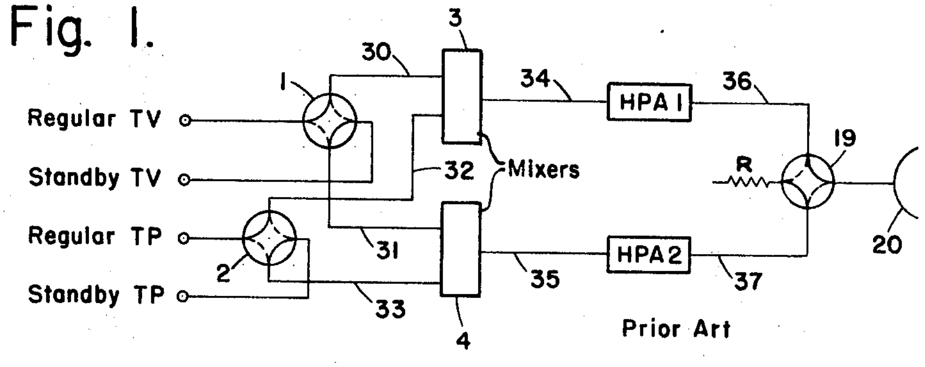
FIG. 1 is a block diagram illustrating a conventional microwave power amplifier network.

Referring now to the drawings and more particularly to FIG. 1 thereof, there is shown a block diagram which serves to illustrate a conventional microwave power amplifier network of the type often employed in the ground stations of satellite communication systems to provide a 100 percent standby arrangement. The conventional microwave power amplifier network illustrated in FIG. 1 comprises a plurality of switch means 1, 2 and 19, first and second mixer means 3 and 4, regular and standby microwave power amplifier means $HPA_1$ and $HPA_2$, and transmitting antenna means 20. The plurality of switch means 1, 2 and 19 take the form of conventional microwave switching devices, such as waveguide rotary switch means, adapted to receive two input signals and, depending upon the state of said switch means 1, 2, and 19, apply said two input signals to the two outputs thereof, respectively, through two of four selectable signal paths therein. The selectable pairs of signal paths present in each of the switch means 1, 2 and 19 are indicated by the solid and dashed lines present within each of said plurality of switch means 1,2 and 19. Thus, when said switch means 1, 2 and 19 are in a first condition, first and second input signals applied thereto will traverse the paths indicated by the solid lines within each of said switch means 1, 2 and 19 so that said first and second input signals are made available at first and second outputs thereof, respectively; while, when said switch means 1, 2 and 19 are in a second condition, first and second input signals applied thereto will traverse the paths indicated by the dashed lines whereby said first and second input signals are made available at the second and first outputs thereof, respectively. The switch means 1, 2 and 19 may be hand actuated or automatically switched in response to the actuating signals supplied by monitoring means not shown herein.

The switch means 1 is connected at a first input portion thereof, as shown in FIG. 1, to a source of regular television signals, indicated at the terminal annotated Regular TV, and, at a second input portion thereof to a source of standby television signals, indicated at the terminal annotated Standby TV. Although not illustrated in FIG. 1, the sources of regular television signals and standby television signals to which the terminals annotated Regular TV and Standby TV are connected may comprise separate transmitter means which act to supply the same television signals to their respective terminals. A first output of the switch means 1 is connected through conductor 30 to a first input of the first mixer means 3 while the second output of said switch means 1 is connected to a first input of the second mixer means 4 over conductor 31. Therefore, it will be seen that regular television signals applied to the first input portion of the switch means 1 may be applied by said switch means 1 through the switch path indicated by the solid line to the first output of said switch means 1 and hence through conductor 30 to the first input of the first mixer means 3 or through the switch path indicated by the dashed line to the second output of said switch means 1 and hence over conductor 31 to the first input of the second mixer means 4, depending on the state of said switch means 1. Similarly, standby television signals applied to the second input portion of the switch means 1 may be applied by said switch means 1 through the switch path indicated by the solid line to the second output of said switch means 1 and hence over conductor 31 to the first input of the second mixer means 4 or through the switch path indicated by the dashed line to the first output of said switch means 1 and thus through conductor 30 to the first input of the first mixer means 3, depending on the state of said switch means 1.

The switch means 2 is connected at a first input portion thereof to a source of regular multiplexed telephony signals, indicated at the terminal annotated Regular TP, and, at a second input portion thereof to a source of standby multiplexed telephony signals, indicated at the terminal annotated Standby TP. The sources of regular and standby telephony signals to which the terminals annotated Regular TP and Standby TP are connected have not been illustrated in FIG. 1 but again may be considered to comprise separate transmitter means which act to supply the same telephony signals to their respective terminals. A first output of the switch means 2 is connected, via conductor 32 as shown in FIG. 1, to a second input of the first mixer means 3 and a second output of said switch means 2 is connected through conductor 33 to a second input of the second mixer means 4. Thus, the switch means 2 is connected in a similar manner to the switch means 1 so that regular telephony signals applied to the first input portion of the switch means 2 may be applied by said switch means 2 through the switch paths indicated by the solid and dashed lines to either the first output of said switch means 2 and thus over conductor 32 to the second input of the first mixer means 3 or to the second output of said switch means 2 and thereby through conductor 33 to the second input of the second mixer means 4, respectively, depending on the state thereof. In a similar manner, standby multiplexed telephony signals applied to the second input portion of the switch means 2 may be applied thereby through the switch paths indicated by the solid or dashed lines to either the second output of said switch means 2 and hence over conductor 33 to the second input of the second mixer means 4 or the first output of said switch means 2 and hence through conductor 32 to the second input of the first mixer means 3 depending on the state of the switch means 2.

The first and second mixer means 3 and 4 are conventional devices which act in the well-known manner to combine the input signals applied to the first and second inputs thereof and accordingly present said combined signals at the outputs thereof. The first mixer means 3 is connected through conductor 30 at the first input thereto to the first output of the switch means 1 while the second input thereof is connected over conductor 32 to the first output of the switch means 2. Thus, depending upon the state of the switch means 1 and 2 the first mixer means 3 may receive at the first and second inputs thereto, regular television and telephony signals, respectively; standby television and telephony signals, respectively; regular television and standby telephony signals, respectively or standby television and regular telephony signals, respectively. The output of the first mixer means 3 is applied through the conductor 34 to the input of the regular microwave amplifier means $HPA_1$ whereupon said regular microwave amplifier means $HPA_1$ may receive either combined regular television and telephony signals, combined standby television and telephony signals, combined regular television and standby telephony signals or combined standby television and regular telephony signals depending upon the state of switch means 1 and 2. Similarly, the second mixer means 4 is connected via the conductor 31 at the first input thereto to the second output of the switch means 1 while the second input thereof is connected through the conductor 33 to the second output of the switch means 2. Accordingly, depending on the state of switch means 1 and 2 the second mixer means 4 may receive at the first and second inputs thereof, respectively, standby television and standby telephony signals, regular television and telephony signals, standby television and regular telephony signals or regular television and standby telephony signals. The output of the second mixer means 4 is connected through the conductor 35 to the input of the standby microwave amplifier means $HPA_2$ so that said standby microwave amplifier means $HPA_2$ may receive, depending on the state of the switch means 1 and 2 combined standby television and telephony signals, combined regular television and telephony signals, combined standby television and regular telephony signals or combined regular television and standby telephony signals.

The regular and standby microwave amplifier means $HPA_1$ and $HPA_2$ take the form of conventional, high power, microwave amplifiers whose bandwidth is sufficient to accommodate the television and multiplexed telephony signals applied thereto. The input of the regular microwave amplifier means $HPA_1$ is connected, as aforesaid, through the conductor 34 to the output of the first mixer means 30 and the output of said regular microwave amplifier amplifier means $HPA_1$ is connected over the conductor 36 to a first input of the switch means 19. The standby microwave amplifier means $HPA_2$ is connected at the input thereof to the output of the second mixer means 4 while the output of said standby microwave amplifier means $HPA_2$ is applied through the conductor 37 to a second input of the switch means 19. The switch means 19, which may take the form described above, is connected at a first output thereof to the transmitting antenna means 20 and at a second output thereof to a dummy load indicated by the resistance R. Thus, it will be seen that the switch means 19 is in receipt of the output of each of the regular and standby microwave power amplifier means $HPA_1$ and $HPA_2$ and may apply either of said outputs to the transmitting antenna means 20 while the other of said outputs is applied to the dummy load R, depending upon the state of said switch means 19 and hence whether the paths indicated by the solid or dashed lines are utilized therein.

In the operation of the conventional microwave amplifier means illustrated in FIG. 1, it may be initially assumed that the regular microwave power amplifier means $HPA_1$ is in a normal operating condition and that regular and standby television and telephony signals are being applied to the requisite terminals therefor. Under these conditions, each of said switch means 1, 2 and 19 will be in a first state wherein the switch paths indicated by the solid lines as present therein are utilized to apply signals received by each of said switch means 1, 2 and 19 at the inputs thereto to the outputs thereof. Thus, when these conditions obtain, it will be appreciated that regular and standby television signals applied to the terminals annotated Regular TV and Standby TV will be applied to the first and second inputs, respectively, of the switch means 1. Such regular and standby television signals as are applied to the switch means 1 when said switch means 1 is in a first state will be applied over the switch paths indicated by the solid lines to the first and second outputs, respectively, thereof and hence regular television signals will be coupled over conductor 30 to the first input of the mixer means 3 while standby television signals will be applied over conductor 31 to the first input of the mixer means 4. In a similar manner, when these conditions are present, regular and standby telephony signals will be applied to the terminals annotated Regular TP and Standby TP and thus applied to the first and second inputs, respectively, of the switch means 2. The regular and standby telephony signals applied to the switch means 2 under these conditions will be conveyed over the switch paths indicated by the solid lines to the first and second outputs, respectively, of said switch means 2 and thus regular multiplexed telephony signals are applied over conductor 32 to the second input of the first mixer means 3 while standby multiplexed telephony signals will be applied to the second input of the second mixer means 4. The first mixer means 3 is thereby in receipt of regular television signals at the first input thereof and regular telephony signals at the second input thereof while the second mixer means 4 receives standby television signals at the first input thereto and standby telephony signals at the second input thereof.

The first mixer means 3 acts in the well-known manner to produce, under these conditions, combined regular television and telephony signals at the single output thereof while the second mixer means 4 acts similarly to produce combined standby television and telephony signals at its output. The output of the first mixer means is applied through the conductor 34 to the input of the regular microwave amplifier means $HPA_1$ which acts in the usual manner to amplify to a suitable power level such combined regular television and telephony signals as are applied thereto and thereafter apply such suitably amplified, combined regular television and telephony signals through the conductor 36 to a first input of the switch means 19. In a similar manner, the output of the second mixer means is conveyed over the conductor 35 to the input of the standby microwave power amplifier means $HPA_2$. The standby microwave power amplifier means $HPA_2$ acts in the well-known manner upon the combined standby television and telephony signals applied thereto to amplify such combined standby signals to a suitable level and thereafter apply them, over conductor 37, to the second input of the switch means 19. The switch means 19, under these conditions, is in a state wherein the paths therethrough, indicated by the solid lines, are utilized and accordingly the combined regular television and telephony signals applied to the first input thereof by the regular microwave amplifier means $HPA_1$ are coupled to the transmitting antenna means 20 for simultaneous transmission while the combined standby television and telephony signals applied to the second input of the switch means 19 by the standby microwave amplifier means $HPA_2$ are coupled to the dummy load R for dissipation. Thus it will be seen that when the regular microwave power amplifier means $HPA_1$ is in the normal operating condition and regular and standby television and telephony signals are applied to the input terminals therefor, combined regular television and telephony signals are applied at a suitably amplified power level to the transmitting antenna means 20 while the power level of the suitably amplified, combined standby television and telephony signals is wasted. Furthermore, under these conditions, intermodulation would be dominant in the microwave power amplifier network depicted in FIG. 1 because the regular television signals and the regular telephony signals are both applied in common to the regular microwave power amplifier means $HPA_1$.

If it is now assumed that a failure has occurred in the regular microwave power amplifier means $HPA_1$, this failure may be detected by monitoring means, not shown herein, located at the outputs of each of the regular and standby microwave power amplifier means $HPA_1$ and $HPA_2$. Upon the detection of a failure in the regular microwave power amplifier means $HPA_1$, the state of the switch means 1, 2 and 19 will be changed from the first to the second state whereupon the signal paths therein indicated by the dashed lines will be relied upon for signal transmission. Thus, under these conditions, regular television and telephony signals will be applied to the standby microwave power amplifier means $HPA_2$, through the dashed paths of the switch means 1 and 2 and the second mixer means 4; and the output of the standby microwave amplifier means $HPA_2$ will be conveyed to the transmitting antenna means 20. The standby television and telephony signals applied under this set of conditions to the switch means 1 and 2, will be applied through the signal paths therein indicated by the dashed lines and the first mixer means 3 to the input of the regular microwave power amplifier means $HPA_1$ which has failed. The output of the regular microwave power amplifier means $HPA_1$ is, under these conditions, connected to the dummy load R through the signal path of the switch means 19 indicated by the dashed lines. The monitoring means, not shown herein, relied upon to detect a failure in the regular and standby microwave power amplifier means $HPA_1$ and $HPA_2$, as well as a return to normal operating conditions thereof, may act in the well-known manner to merely detect and indicate a failure, whereupon the switch means 1, 2 and 19 are activated by hand or may additionally serve to automatically actuate the switch means 1, 2 and 19 to thereby selectively change the states thereof. Furthermore, such monitoring means must act to detect a condition wherein the sources of regular television or telephony signals have become defective so that the state of switch means 1 and/or 2 may be selectively changed so that standby television or telephony signals may be supplied in place of the defectively provided regular television or telephony signals. Thus, for instance, assuming both the regular and standby microwave power amplifier means to be functioning normally, if both the sources of regular television and telephony signals fail, the states of both switch means 1 and 2 will be changed to the second state whereupon standby television and telephony signals both will be applied to the first mixer means 3; if only the source of regular television signals fail, the state of switch means 1 will be changed to a second condition whereby standby television signals and regular telephony signals will be applied to the first mixer means 3; while if only the source of regular telephony signals fail, the state of switch means 2 will be changed to the second condition so that regular television signals and standby telephony signals will be applied to the first mixer means 3.

As may readily be appreciated from the foregoing, under any of the conditions of failure enumerated above, the microwave power amplifier network illustrated in FIG. 1 will act appropriately to supply the requisite power to the transmitting antenna means 20; however, as in each case, regular and/or standby television and telephony signals are commonly applied to the microwave power amplifier means $HPA_1$ or $HPA_2$ connected to the transmitting antenna means 20, intermodulation noise will always be dominant in the illustrated microwave power amplifier network. When this operating factor is considered with the high installation cost of the microwave power amplifier network illustrated in FIG. 1 and the highly uneconomical power utilization thereof during the normal operating condition of the regular microwave power amplifier means $HPA_1$, it will be seen that such conventional microwave power amplifier means leave much to be desired from a practical engineering standpoint.

Figure 2:
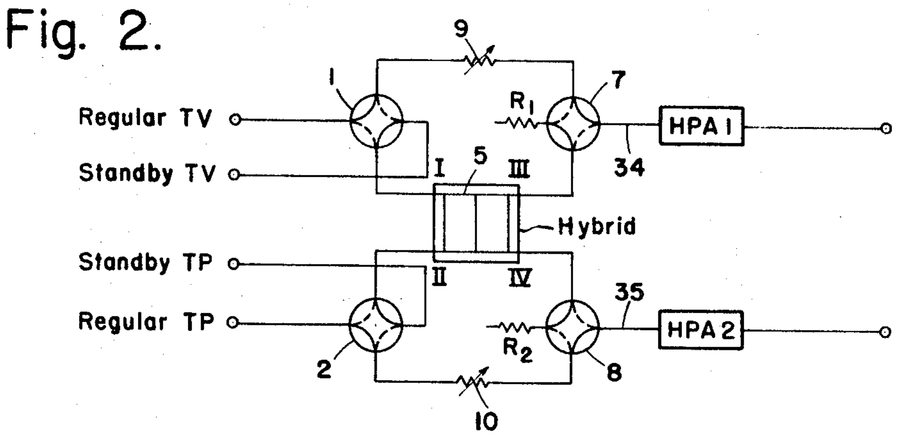
FIG. 2 is a block diagram which schematically shows an exemplary embodiment of a microwave power amplifier network according to the present invention.

FIG. 2 is a block diagram which schematically illustrates an exemplary embodiment of a microwave power amplifier network according to the present invention. Since FIG. 2 and FIGS. 3—5 which follow, include a plurality of circuit elements which are common to the microwave power amplifier network depicted in FIG. 1, where applicable, like elements have retained previously utilized reference numerals so that the continuity of the descriptive portion of this specification is maintained. Accordingly, where such common elements appear in FIGS. 2—5, the description of the structure and elemental functions thereof will be made by way of a direct reference to the conventional microwave power amplifier network illustrated in FIG. 1.

The exemplary embodiment of the microwave power amplifier network illustrated in FIG. 2 has been set forth by way of example to acquaint the reader with the input switching arrangement of the present invention. Accordingly, no transmitting antenna means or the switch means therefor has been illustrated in FIG. 2; however, it will be realized that this omission is here made to avoid initial confusion and that such transmitting antenna means and the switch means therefor may readily be provided by those of ordinary skill in the art when the portions of this disclosure which follow are considered. The embodiment of the microwave power amplifier shown in FIG. 2 includes switch means 1, 2, 7 and 8, hybrid circuit means 5, and regular and standby microwave power amplifier means $HPA_1$ and $HPA_2$. The switch means 1, 2, 7 and 8 illustrated in FIG. 2 may each take the form of the switch means 1 and 2 described above in conjunction with FIG. 1. Accordingly each of said switch means 1, 2, 7 and 8 includes first and second inputs, first and second outputs and four discrete signal paths therein such that signals applied to said first and second inputs may be conveyed to the first and second outputs thereof, respectively, when said switch means are in a first state wherein the signal paths indicated by the solid lines are operative or alternatively signals received at said first and second inputs may be applied to the second or first outputs thereof, respectively, through the signal paths indicated by the dashed lines when said switch means 1, 2, 7 and 8 are in a second state. The switch means 1, as was the case in the microwave power amplifier network of FIG. 1, is connected at a first input portion thereof to a source of regular television signals, indicated at the terminal annotated Regular TV, and at a second input portion thereof to a source of standby television signals, indicated at the terminal annotated Standby TV. The sources of regular and standby television signals, not shown in FIG. 2, which are connected to the terminals annotated Regular TV and Standby TV, may comprise separated transmitter means adapted to supply the same television signals as were described above in conjunction with FIG. 1. A first output of the switch means 1 is connected through the variable attenuator means 9 to a first input of the switch means 7. The variable attenuator means 9, may take any conventional form, such as a variable resistor, and as shall be seen hereinafter, serves to equalize the power levels of television signals applied to the regular microwave power amplifier means $HPA_1$ from the first output of the switch means 1 with those applied to the regular microwave amplifier means $HPA_1$ from other signal paths. The second output of the switch means 1 is connected to a first input I of the hybrid circuit means 5. The hybrid circuit means 5 may comprise any of the conventional forms of hybrid junctions which act in the well-known manner to cause an input signal applied to one of the inputs I or II thereof to divide between the outputs III and IV thereof, while isolating said input signal from the other input II or I thereof. Thus, television signals coupled to the input I of the hybrid circuit means 5 will be applied to each of the outputs III and IV thereof. The first output III of the hybrid circuit means 5 is connected to the second input of the switch means 7. As hybrid devices such as hybrid circuit means 5 exhibit a clearly defined loss, the variable attenuator means 9 is set at a value to insert a similar loss into signals passing therethrough so that signals applied to the first and second inputs of said switch means 7 will be at the same power levels. The switch means 7 is connected at a first output thereof, through conductor 34 to the input of the regular microwave power amplifier means $HPA_1$ which may be considered to be the same as the regular microwave power amplifier means $HPA_1$ described in conjunction with FIG. 1. The second output of the switch means 7 is connected to a dummy load $R_1$ which may take the same form as the dummy load R illustrated in FIG. 1. Therefore, it will be seen that depending upon the state of the switch means 1 either regular television signals are applied to the first input of the switch means 7 while standby television signals are applied to the first input I of the hybrid circuit means 5 or standby television signals are applied to the first input of the switch means 7 while regular television signals are applied to the first input I of the hybrid circuit means 5. Furthermore, depending upon the state of the switch means 7, either the television signals applied to the first input thereof will be coupled through the paths indicated by the solid lines to the input of the regular microwave power amplifier means $HPA_1$ while the first output III of the hybrid circuit means 5 is applied to the dummy load $R_1$ or the first output III of the hybrid circuit means 5 will be conveyed through the signal paths indicated by the dashed lines to the input of the regular microwave amplifier means $HPA_1$ while the television signals coupled to the first input thereof will be applied to the dummy load $R_1$.

Similarly, the switch means 2 is connected, as was the case in FIG. 1, at a first input portion thereof to a source of regular multiplexed telephony signals, indicated at the terminal annotated Regular TP, and, at a second input portion thereof to a source of standby multiplexed telephony signals, indicated at the terminal annotated Standby TP. The sources of regular and standby telephony signals connected to the terminals annotated Regular TP and Standby TP, respectively, are not shown in FIG. 2; however, as was the case in the conventional microwave power amplifier network illustrated in FIG. 1, such sources may be considered to be separate transmitter means capable of supplying the same multiplexed telephony signals to their respective terminal means. A first output of the switch means 2 is connected to the first input of the switch means 8 through the variable attenuator means 10. The variable attenuator means 10 may take the same form as the previously described variable attenuator means 9 and acts in the same manner thereas to equalize the power levels of telephony signals applied to the standby microwave power amplifier means $HPA_2$ as signals applied thereto through other signal paths. The second output of the switch means 2 is coupled to the second input II of the hybrid circuit means 5. Thus, if the switch means 2 is in a first state wherein the signal paths therethrough indicated by the solid lines are enabled, regular telephony signals will be applied through the variable attenuator means 10 to the first input of the switch means 8 while standby telephony signals are applied to the second input II of the hybrid circuit means 5; however, if the switch means 2 is in a second state wherein the signal paths therethrough indicated by the dashed lines are enabled, regular telephony signals are applied to the second input II of the hybrid circuit means 5 while standby telephony signals are applied to the first input of the switch means 8 through the variable attenuator means 10.

The hybrid circuit means 5 is connected at the second output IV thereof to the second input of the switch means 8. In addition, a first output of the switch means 8 is connected over conductor 35 to the input of the standby microwave power amplifier means $HPA_2$ while a second output thereof, as shown in FIG. 2, is connected to the dummy load $R_2$. The standby microwave power amplifier means $HPA_2$ may take precisely the same form as that described in conjunction with the conventional microwave power amplifier network described above and the dummy load $R_2$ may take the same form as the dummy load $R_1$. Thus, if the switch means 8 is in a first state wherein the signal paths therein indicated by the solid lines are enabled, the telephony signals applied to the first input of said switch means 8 will be applied to the input of the standby microwave power amplifier means $HPA_2$ and the second output IV of the hybrid circuit means 5 will be applied to the dummy load $R_2$; however, when the switch means 8 is in a second state wherein the signal paths therein indicated by the dashed lines are enabled, the telephony signals conveyed to the first input of said switch means 8 will be applied to the dummy load $R_2$ while the second output IV of the hybrid circuit means 5 is applied to the input of the standby microwave power amplifier means $HPA_2$.

In the operation of the exemplary embodiment of the microwave power amplifier network according to the present invention, as illustrated in FIG. 2, it will be initially assumed that both the regular and standby microwave power amplifier means are operating normally and, in addition, that each of the regular television and telephony transmitting means is functioning properly to provide regular television and regular telephony signals at each of the terminals annotated Regular TV and Regular TP, respectively. When these conditions obtain, each of the switch means 1, 2, 7 and 8 is in a first state wherein the signal paths therein indicated by the solid lines are engaged so that the first and second inputs thereto are connected to the first and second outputs thereof, respectively. Thus, under these conditions, regular television signals applied to the terminal annotated Regular TV are applied to the first input of the switch means 1 and conveyed therethrough by the signal path indicated by the solid line to the variable attenuator means 9. The variable attenuator means 9 acts in the previously described manner to insert the requisite loss, equal to the loss inserted by the hybrid circuit means 5 in signals conveyed thereby, in the regular television signals conveyed therethrough and these signals are subsequently applied to the first input of the switch means 7. The regular television signals received at the first input to the switch means 7 are conveyed, under these conditions, by the signal path therein indicated by the solid line to the first output of such switch means 7 and hence to the input of the regular microwave power amplifier means $HPA_1$. In a similar manner, under these initially assumed conditions, regular telephony signals applied by the telephony transmitter means, not shown herein, to the terminal annotated Regular TP are coupled to the first input of the switch means 2 and conveyed therethrough by the signal path indicated by the solid line to the first output of said switch means 2. The regular telephony signals thus present, under these conditions, at the first output of the switch means 2 are applied to the variable attenuator means 10. The variable attenuator means 10 acts to insert the requisite loss in such regular telephony signals as are applied thereto and thereafter such regular telephony signals are applied to the first input of the switch means 8. The switch means 8, under these conditions, has the signal paths therein indicated by the solid lines enabled whereby the signals applied to the first input thereto are conveyed to the first output thereof and hence through conductor 35 to the input of the standby microwave power amplifier means $HPA_2$. Therefore, under these initially assumed conditions, the regular and standby microwave amplifier means $HPA_1$ and $HPA_2$ receive regular television and regular telephony signals, respectively and each of said regular and standby microwave power amplifier means $HPA_1$ and $HPA_2$ may act appropriately thereon to supply the signals applied thereto to transmitting antenna means which are not shown herein.

Conversely, standby television signals applied to the terminal annotated Standby TV are applied to the second input of the switch means 1 and through the signal path indicated by the solid line to the second output thereof. The second output of the switch means 1 is connected to the first input I of the hybrid circuit means 5 and hence such standby television signals as are applied to the first input I thereof are present at the first and second outputs III and IV of the hybrid circuit means 5. In a similar manner, the standby telephony signals applied to the terminal annotated Standby TP are applied to the second input of the switch means 2 and through the signal path indicated by the solid line therein to the second output thereof. The second output of the switch means 2 is connected to the second input II of the hybrid circuit means 5 and accordingly, said standby telephony signals are applied to the first input II of said hybrid circuit means 5. The standby telephony signals applied, under these conditions, to the second input II of the hybrid circuit means 5 are presented thereby, in the well-known manner, to the first III and second IV outputs thereof. Thus, as standby television signals are applied as aforesaid to the first input I of the hybrid circuit means 5 and standby telephony signals are applied in the manner stated above to the second input II of the hybrid circuit means 5, said hybrid circuit means 5 will have standby television and standby telephony signals present at each of the first III and second IV outputs thereof.

The first output III of the hybrid circuit means 5 is connected to the second input of the switch means 7 while the second output IV of the hybrid circuit means 5 is connected to the second input of the switch means 8. Under the initial conditions specified above, each of the switch means 7 and 8 have the switch paths therein indicated by the solid lines enabled so that the second input of each of said switch means 7 and 8 is connected to the second output thereof. Thus, as each of the second outputs of the switch means 7 and 8 is connected to the dummy loads $R_1$ and $R_2$, respectively, the first and second outputs III and IV of the hybrid circuit means 5, applied to the second inputs of switch means 7 and 8 are each dissipated at the dummy loads $R_1$ and $R_2$, respectively.

Therefore, it will be seen, that when both the regular and standby microwave power amplifier means $HPA_1$ and $HPA_2$ and the regular television and telephony signal transmitters, not shown, are functioning normally, the regular and standby microwave power amplifier means $HPA_1$ and $HPA_2$ are in receipt of regular television and telephony signals, respectively, so that each of said regular and standby microwave power amplifier means $HPA_1$ and $HPA_2$ acts individually to supply regular television or telephony signals to transmitting antenna means, not shown, connected to the outputs thereof. Thus, in the microwave power amplifier networks according to the present invention, power from the standby microwave power amplifier means $HPA_2$ is not wasted when the regular microwave power amplifier means $HPA_1$ is operating normally; but, under the initial conditions outlined above, power utilization is optimized. Furthermore, under the initial conditions set out above, as each of the regular and standby microwave power amplifier means $HPA_1$ and $HPA_2$ acts individually on television and telephony signals, respectively, intermodulation noise will not be dominant as in the conventional microwave power amplifier network illustrated in FIG. 1, but such intermodulation noise will be markedly reduced in the microwave power amplifier network according to the present invention.

If it is now assumed that a failure has taken place in the regular microwave power amplifier means $HPA_1$ while the standby microwave power amplifier means $HPA_2$ and the regular television and telephony signal transmitters remain in a normal operating condition; the switch means 1, 2 and 8 will be switched to a second state wherein the signal paths present therein, as indicated by the dashed lines, are enabled while the switch means 7 is retained in its first state wherein the signal paths present therein, as indicated by the solid lines, are enabled. The switch means 1, 2, 7 and 8 may, as aforesaid, be hand actuated or automatically controlled by monitoring means relied upon to detect the various conditions of failure which are discussed below. The monitoring means relied upon to detect such various conditions of failure form no part of the present invention and hence have not been illustrated herein. Thus, the requisite monitoring means utilized may take the form of any means capable of determining whether or not television or telephony signals are present at the outputs of the regular and standby microwave power amplifier means $HPA_1$ and $HPA_2$ and whether regular or standby television or telephony signals are being supplied to said regular and standby microwave power amplifier means $HPA_1$ and $HPA_2$. For instance, such monitoring means may comprise the monitoring means discussed in conjunction with the conventional microwave power amplifier network illustrated in FIG. 1 and, in addition, when automatic switching is desired, a recognition circuit means, such as a diode matrix, having one lead connected to each switch means may be utilized so that the state of each switch is changed in accordance with the condition monitored. However, as the form and nature of the monitoring means and the manner in which the switch means 1, 2, 7 and 8 are actuated are not considered to form a part of this invention per se, such means and the modes of operation thereof will not be further discussed herein, but it will be merely noted that a given condition obtains and that the state of the respective switch means are appropriately changed in response thereto. Thus, when the aforementioned condition is detected wherein a failure has occurred in the regular microwave power amplifier means $HPA_1$ while the standby microwave power amplifier means $HPA_2$ and the regular television and telephony transmitters remain in a normal operating condition; the switch means 1, 2 and 8 will be switched to a second state while the switch means 7 is retained in the first state.

With the switch means 1, 2 and 8 in their second state and the switch means 7 retained in its first state, the regular television signals applied to the first input of the switch means 1 will be conveyed to the second output of said switch means 1 and hence to the first input I of the hybrid circuit means 5 connected thereto by the signal paths therein indicated by the dashed lines which have now been enabled. Similarly, regular telephony signals applied to the first input of the switch means 2 will be applied by the signal paths therein indicated by the dashed lines to the second output of said switch means 2 and hence to the second input II of the hybrid circuit means 5. Accordingly, as regular television signals are supplied under these conditions to the first input I of the hybrid circuit means 5 by the switch means 1, and regular telephony signals are applied to the second input II of the hybrid circuit means 5 by the switch means 2, the first III and second IV outputs of the hybrid circuit means 5, will each have regular television and telephony signals present thereat. Furthermore as the television and telephony signals present at each of the first and second outputs III and IV of the hybrid circuit means 5 have been attenuated due to the insertion loss of such hybrid circuit means 5, the power level of the signals present at each output III and IV of the hybrid circuit means 5 will be the same as if a television or telephony signal had passed through the variable attenuator means 9 or 10, respectively. The first output III of the hybrid circuit means 5 is connected to the second input of the switch means 7 while the second output IV of said hybrid circuit means 5 is connected to the second output of the switch means 8. As the switch means 7 has been retained in its first state, wherein signals applied thereto are conveyed by the signal paths indicated by the solid lines therein, the first output III of the hybrid circuit means 5 is applied through the switch means 7 to the first dummy load $R_1$ and is thus dissipated thereby. In contradistinction thereto, the switch means 8 is in its second state, wherein signals applied thereto traverse the signal path therethrough indicated by the dashed lines therein, and thus the second output IV of the hybrid circuit means 5, coupled to the second input of the switch means 8 is applied to the first output of said switch means 8 which is connected to the standby microwave power amplifier means $HPA_2$. Thus, under the second set of conditions specified above, where the regular microwave power amplifier means $HPA_1$ has failed, regular television and telephony signals are applied to the input of the standby power amplifier means $HPA_2$ for amplification to a suitable power level and subsequent application to the transmitting antenna means, not shown in FIG. 2.

Conversely, under this second set of conditions, standby television signals applied to the second input of the switch means 1, which is here in its second state, will be conveyed thereby through the signal paths therein indicated by the dashed lines to the first input of the switch means 1 via the variable attenuator means 9. As the variable attenuator means 9 is set to duplicate the insertion loss of the hybrid circuit means 5, the standby television signals applied to the first input of the switch means 7 will be at the same power level as the regular telephony and television signals applied to the second input thereof by the first output III of the hybrid circuit means 5. As the switch means 7 has been, under these conditions, retained in its first state, wherein signals applied thereto will be conveyed by the signal paths therein indicated by the solid lines, the standby television signals applied to the first input thereof will be applied to the conductor 34 and hence to the input of the regular microwave power amplifier means $HPA_1$ which has failed. However, such standby television signals, which are not to be transmitted under the conditions presently being discussed, will be available for monitoring at the output of the regular microwave power amplifier means $HPA_1$ when said regular microwave power amplifier means $HPA_1$ returns to its normal operating condition. In a similar manner, the standby telephony signals applied to the terminal annotated Standby TP are applied to the second input of the switch means 2 which under this second set of conditions is in its second state wherein signals applied thereto will be conveyed through the signal paths therein indicated by the dashed lines. The standby telephony signals thus applied to the second input of the switch means 2 are thereby applied to the first output thereof and hence to the first input of the switch means 8 via the variable attenuator means 10. The variable attenuator means 10 acts as aforesaid to insert the requisite loss into the standby telephony signals applied by the first output of said switch means 2 to the first input of said switch means 8. The switch means 8 is in its second state under these conditions and accordingly, the standby telephony signals applied to the first input thereof are coupled via the signal path therein indicated by the dashed lines to the second dummy load $R_2$ where such standby telephony signals are dissipated.

Therefore, it will be seen that under the conditions wherein the regular microwave power amplifier means $HPA_1$ has failed while the standby microwave power amplifier means $HPA_2$ and the regular television and telephony transmitters are functioning normally, the mode of operation of the microwave power amplifier network illustrated in the embodiment of the invention shown in FIG. 2 is switched so that the standby microwave power amplifier means $HPA_2$ no longer acts upon only telephony signals but receives both telephony and television signals from the second output IV of the hybrid circuit means 5. Thus, under conditions where the standby microwave power amplifier means $HPA_2$ acts commonly upon both television and telephony signals applied thereto, the intermodulation noise is no longer markedly reduced as in a case where the regular microwave power amplifier means $HPA_1$ separately acts upon only the television signals supplied thereto while the standby microwave power amplifier means $HPA_2$ separately acts only on telephony signals applied thereto; however, the intermodulation noise never becomes worse than in conventional microwave power amplifier networks such as that illustrated in FIG. 1. In addition, when said regular microwave power amplifier means $HPA_1$ has failed, television signals which are not to be further transmitted are supplied to the input thereto so that upon the return to a normal operating condition of said regular microwave power amplifier means $HPA_1$, such television signals as are not to be further transmitted may be monitored at the output thereof.

The first set of initial conditions assumed above was directed to the case wherein each portion of the microwave power amplifier network illustrated in FIG. 2 was functioning normally, while the second set of initial conditions was directed to one type of failure which could occur therein. As will be obvious to those of ordinary skill in the art, a plurality of operating failures can occur during the operation of a microwave power amplifier network such as that illustrated in FIG. 2 and regardless of such failure, power and information signals must be supplied to the transmitting antenna means. The various conditions of failure which may obtain during the operation of the microwave power amplifier network illustrated in FIG. 2 together with the requisite, corresponding states of the switch means 1, 2, 7 and 8 necessary to supply power and information to the transmitting means during such failure are summarized in Table I below. In Table I, N stands for Normal, F stands for Faulty, SL stands for Solid Line, DL stands for Dashed Line and an asterisk * indicates either a solid or dashed switch path may be present.

TABLE I

| | HAP | | Switch | | | | |
|---|---|---|---|---|---|---|---|
| Constituent | 1 | 2 | 1 | 2 | 7 | 8 | Remarks |
| State: | | | | | | | |
| a | N | N | SL | SL | SL | SL | To remedy both TP and TV. |
| b | N | F | DL | DL | DL | SL | |
| c | F | N | DL | DL | SL | DL | |
| d | N | F | SL | DL | DL | * | To remedy only TP. |
| e | F | N | * | SL | * | SL | |
| f | N | F | SL | * | SL | * | To remedy only TV. |
| g | F | N | DL | SL | * | DL | |
| h | N | N | DL | DL | SL | SL | Both regular TV and TP have failed. |
| i | F | N | SL | SL | * | DL | |
| j | N | F | SL | SL | DL | * | |
| k | N | N | DL | SL | SL | SL | Regular TV has failed. |
| l | F | N | SL | DL | * | DL | |
| m | N | F | SL | DL | DL | * | |
| n | N | N | SL | DL | SL | SL | Regular TP has failed. |
| o | F | N | DL | SL | * | DL | |
| p | N | F | DL | SL | DL | * | |

Under each of the conditions summarized in Table I, it should be noted that whenever both the regular and standby microwave power amplifier means $HPA_1$ and $HPA_2$ are functioning properly, each of said power amplifier means is utilized separately to act upon one type of signal to thereby achieve a marked reduction in intermodulation noise and maximum power utilization. Furthermore, when a failure occurs in either regular or standby microwave power amplifier means $HPA_1$ or $HPA_2$, the microwave power amplifier means remaining properly operative is caused to act in a common amplifying mode and signals which are not to be further transmitted are applied, assuming the correct switch setting therefor, to the input of such failed microwave power amplifier means so that said signals may be monitored upon the return of such failed microwave power amplifying means to a normal operating condition. Thus, in the case where separate amplification takes place, i.e., where both the regular and standby microwave power amplifier means are properly operative, if it is sufficient to transmit only television or telephony signals, the so-called hot-standby system of conventional microwave power amplifier networks may be realized in the embodiment of the microwave power amplifier network according to the present invention as illustrated in FIG. 2.

Figure 3:
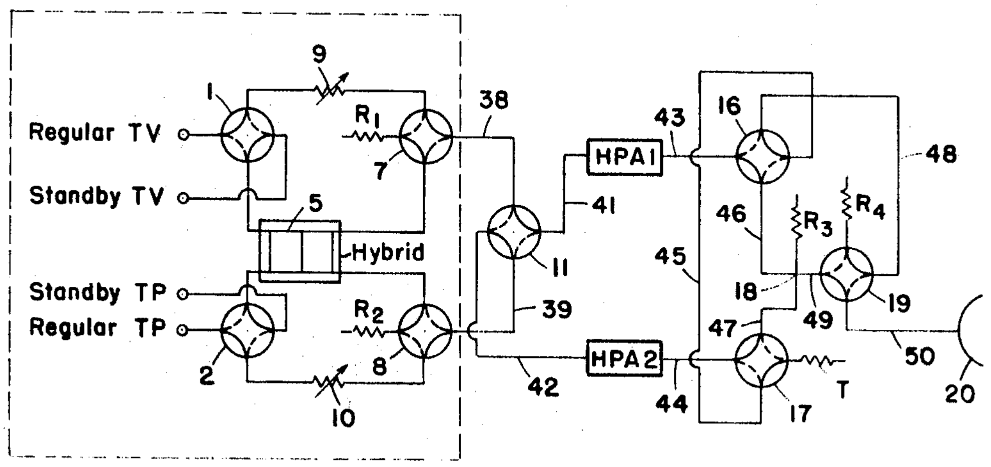
FIG. 3 is a block diagram showing another embodiment of the microwave power amplifier network according to the present invention.

FIG. 3 illustrates another embodiment of the microwave power amplifier network according to the present invention. The embodiment of the microwave power amplifier network illustrated in FIG. 3 is a block diagram which schematically illustrates a complete microwave power amplifier network, including the transmitting antenna means 20 associated therewith and accordingly may be considered as a typical, practical embodiment of the microwave power amplifier means according to the present invention. The embodiment of the microwave power amplifier means illustrated in FIG. 3 comprises switch means 1, 2, 7, 8, 11, 16, 17 and 19; hybrid circuit means 5, variable attenuator means 9 and 10, regular and standby microwave power amplifier means $HPA_1$ and $HPA_2$, hybrid mixer means 18, and transmitting antenna means 20. The switch means 1, 2, 7 and 8, the hybrid circuit means 5 and the variable attenuator means 9 and 10 each may take the same form, perform the same function and are interconnected in the same manner as the correspondingly designated circuit elements illustrated in the FIG. 2 embodiment of the present invention. Accordingly, each of these elements has been enclosed in FIG. 3 within the dashed block A so that the input circuit formed by these elements may be more easily identified and the description of the character and nature of the input circuitry thus enclosed within dashed block A will not be reiterated here as it was described in detail above in conjunction with the FIG. 2 embodiment. Thus, omitting the description of the input circuitry contained in the dashed block A, the disclosure of this embodiment of the present invention will proceed from the points at which the input circuitry present in the dashed block A connects with the remainder of the circuitry depicted in FIG. 3.

The first output of the switch means 7, enclosed within the dashed block A, is connected through the conductor 38 to a first input of the switch means 11 and the first output of the switch means 8, also present within the dashed block A, is connected through the conductor 39 to a second input of the switch means 11. The switch means 11 may take the form of any of the switch means previously described above and accordingly includes two pairs of signal paths therein so that the first and second inputs thereto may be connected to the first and second outputs thereof when the switch means 11 is in a first state, wherein the signal paths indicated by the solid lines are enabled, while when the switch means 11 is in a second state, wherein the signal paths therein indicated by the dashed lines are enabled, the first and second inputs thereto will be connected to the second and first outputs thereof, respectively. The first output of the switch means 11 is connected through the conductor 41 to the input of the regular microwave power amplifier means $HPA_1$ and the second output of the switch means 11 is connected to the input of the standby microwave power amplifier means $HPA_2$ over the conductor 42. The switch means 11 thus serves in the role of a reversing switch whereby the first output of the switch means 7 may be applied to either the input of the regular or standby microwave power amplifier means $HPA_1$ or $HPA_2$ while the first output of the switch means 8 is applied to either the input of the standby or regular microwave power amplifier means $HPA_2$ or $HPA_1$, depending upon the state of the switch means 11.

The regular and standby microwave power amplifier means $HPA_1$ and $HPA_2$ may take the form of any of the microwave power amplifier means previously described above. The output of the regular microwave power amplifier means $HPA_1$ is connected through the conductor 43 to the first input of the switch means 16 and the output of the standby microwave power amplifier means $HPA_2$ is connected through the conductor 44 to the first input of the switch means 17. The switch means 16 and 17 may each take the same form as the switch means previously described above and thus each is provided with two pairs of signal paths therethrough which may be selectively enabled. The second input of the switch means 16 is connected through the conductor 45 to the second output of the switch means 17 while the second input of the switch means 17 is merely connected to the termination T. The first outputs of each of the switch means 16 and 17 are connected through conductors 46 and 47, respectively, to the hybrid mixer means 18 and the second output of the switch means 16 is connected to a second input of the switch means 19 over conductor 48. Thus, when the switch means 16 is in a first condition, wherein the signal paths indicated by the solid lines are enabled, the output of the regular microwave amplifier means $HPA_1$ is connected through conductor 46 to the hybrid mixer means 18 and the second output of the switch means 17 is coupled by said switch means 16 from the conductor 45 to the second input of the switch means 19 through conductor 48. However, when the switch means 16 is in its second state, wherein the signal paths indicated by the dashed lines are enabled, the output of the regular microwave power amplifier means $HPA_1$ is connected thereby to the second input of the switch means 19 through conductors 43 and 48 while the second output of the switch means 17 is connected through conductors 45 and 46 to an input of the hybrid mixer means 18. Similarly, when switch means 17 is in a first state, wherein the signal paths therein indicated by the solid lines are enabled, the output of the standby microwave power amplifier means $HPA_2$ is connected through conductors 44 and 47 to the hybrid mixer means 18 while the second output of said switch means 17 is connected to the terminated input thereof. However, when the switch means 17 is in its second state, wherein the signal paths therethrough indicated by the dashed lines are enabled, the output of the standby microwave power amplifier means $HPA_2$ is coupled to the second input of the switch means 16 through conductors 44 and 45 while the terminated second input of the switch means 17 is coupled to the hybrid mixer means 18 over conductor 47.

The hybrid mixer means 18 may take the form of any microwave circuit means capable of combining first and second signals applied thereto and providing at the output portions thereof waveforms representative of said combined signals. The first output of said hybrid mixer means 18 is connected over the conductor 49 to a first input of the switch means 19 while the second output of the hybrid mixer means 18 is terminated in the dummy load $R_3$. The switch means 19, which takes the form of the other switch means described herein, is connected at a first output thereof to the transmitting antenna means 20 through the conductor 50 and at a second output thereof to the dummy load $R_4$. Therefore, it will be seen that when the switch means 19 is in a first state, wherein the signal paths therein indicated by the solid lines are enabled, the first output of the hybrid mixer means 18 is connected therethrough, via the conductors 49 and 50 to the transmitting antenna means 20 while the second output of the switch means 19 is connected through conductor 48 and the second input thereto to the dummy load $R_4$. Conversely, when the switch means 19 is in its second state, wherein the switch paths therethrough indicated by the dashed lines are enabled, the first output of the hybrid mixer means 18 is connected through the conductor 49 to the dummy load $R_4$ while the second output of the switch means 16 is connected over conductors 49 and 50 to the transmitting antenna means 20.

In the description of the operation of the embodiment of the microwave power amplifier network illustrated in FIG. 3, it will be initially assumed that the regular and standby microwave power amplifier means $HPA_1$ and $HPA_2$ are in a normal operating condition and, in addition thereto, that the regular television and telephony signal transmitters, not shown herein, connected to the terminals annotated Regular TV and Regular TP, respectively, are functioning properly. When these conditions obtain, each of the switch means 1, 2, 7, 8, 11, 16, 17 and 19 present in the embodiment of this invention depicted in FIG. 3 may be considered to be in their first states wherein the signal paths therethrough indicated by the solid lines are enabled. Thus, under this initial set of conditions regular television signals applied to the terminal annotated Regular TV will be applied by the switch means 1 and 7 to the conductor 38 in the same manner described above in conjunction with the FIG. 2 embodiment of the present invention. Similarly, regular telephony signals applied to the terminals annotated Regular TP will be conveyed by switch means 2 and 8 to the conductor 39 in the manner described anent FIG. 2. The standby television and telephony signals applied to the terminals annotated Standby TV and Standby TP, respectively, will however, be applied, under these conditions, to the hybrid circuit means 5 and thereafter dissipated at the dummy loads $R_1$ and $R_2$ in the manner stated above.

The regular television signals thus applied to the conductor 38 are coupled thereby to the first input of the switch means 11 while the regular telephony signals applied to the conductor 39 are further conveyed thereby to the second input of the switch means 11. As the switch means 11 is in its first state wherein the signal paths therethrough indicated by the solid lines are enabled, the regular television signals applied to the first input thereof are conveyed to the regular microwave power amplifier means $HPA_1$ connected to the first output thereof while the regular multiplexed telephony signals conveyed to the second input of said switch means 11 are applied thereby to the standby microwave power amplifier means $HPA_2$ connected to the second output thereof. The regular television signals applied to the input of the regular microwave power amplifier means $HPA_1$ undergo suitable amplification thereat to a suitable power level and are thereafter applied through conductor 43 to a first input of the switch means 16. As the switch means 16, under the conditions specified above, is in a first state wherein the signal paths present therein as indicated by the solid lines are utilized, the regular television signals, thus amplified to a suitable power level, are applied through the conductor 46 to a first input of the hybrid mixer means 18. In a similar manner, the regular telephony signals applied to the input of the standby microwave power amplifier means $HPA_1$ receive suitable amplification to an appropriate power level therein and are subsequently conveyed thereby to the first input of the switch means 17 through the conductor 44. Since the switch means 17 is in its first state wherein the signal paths indicated by the solid lines are enabled, the suitably amplified regular telephony signals applied to the first input are conveyed thereby through the conductor 47 to a second input of the hybrid mixer means 18. However, as the second, terminal input of the switch means 17 is, under these conditions, connected to the second output of said switch means 17, no output signals will here be applied from the second output of the switch means 17 through the conductor 45 to the second input of the switch means 16 and hence, no output signals will be applied by the second output of the switch means 16 through conductor 48 to the second input of the switch 19.

The suitably amplified, regular television signals applied through the conductor 46 to the first input of the hybrid mixer means 18 from the first output of the switch means 16 and the suitably amplified, regular telephony signals applied through the conductor 47 to the second input of the hybrid mixer means 18 from the first output of the switch means 17, are appropriately combined in the well-known manner by said hybrid mixer means 18. Thereafter, a portion of such suitably amplified and combined regular television and telephony signals are applied by said hybrid mixer means 18 to the first input of the switch means 19 through the conductor 49. The switch means 19, under the initial conditions stated hereinabove, is in a first state so that the signal paths therein indicated by the solid lines are engaged. Accordingly, when the switch means 19 is in the first state, the suitably amplified and combined regular television and telephony signals applied to the first input thereof by the hybrid mixer means 18 are coupled through the conductor 50 to the transmitting antenna means 20 for transmission. The second input of the switch means 19 is connected under these conditions to the second output thereof and hence to the dummy load $R_4$. However, as aforesaid, since no input signals are applied under these conditions through the conductor 48 to the second input of the switch means 19, no signals are here dissipated at the dummy load $R_4$.

Thus, it will be appreciated that when the regular and standby microwave amplifier means $HPA_1$ and $HPA_2$ are in their normal operating condition, and the regular television and telephony signal transmitters are supplying appropriate signals to their respective terminals, here annotated Regular TV and Regular TP, respectively; each of said regular and standby microwave power amplifier means $HPA_1$ and $HPA_2$ will be operative in this embodiment of the microwave power amplifier means according to the present invention to individually and separately amplify to appropriate power levels either regular television or regular telephony signals. Therefore, under these conditions, the power output of each of said regular or standby microwave power amplifier means $HPA_1$ and $HPA_2$ will be utilized and none will be wastefully dissipated across a dummy load $R_4$. FUrthermore, as each of said regular or standby amplifier means $HPA_1$ and $HPA_2$ acts, under these conditions, on only one type of signal, intermodulation noise will be markedly reduced. In addition, it should be noted that although the foregoing description assumed switch means 11 to be in a first state under the initial conditions assumed above, said switch means 11 could also be in the second state wherein the switch paths therein indicated by the dashed lines would be enabled. If said switch means 11 was placed in said second state while each of the other conditions stated above remained constant, the operation of the embodiment of the invention illustrated in FIG. 3 would only be modified to the extent that regular telephony signals would be applied to the input of the regular microwave power amplifier means $HPA_1$ from the first output of the switch means 11 while regular television signals would be applied to the input of the standby microwave power amplifier, means $HPA_2$ from the second output of the switch means 11. Thereafter, the operation of the embodiment of the microwave power amplifier network illustrated in FIG. 3 would be the same as previously described wherein regular telephony signals would traverse the circuitry to which regular television signals were previously applied and the converse thereof.

Although many possible conditions of failure may be corrected and specific alternate modes of operation provided by selectively changing the states of the switch means 1, 2, 7, 8, 11, 16, 17 and 19 present in the embodiment of the microwave power amplifier network illustrated in FIG. 3; only the correction of one such failure will be described in detail below while the manner of correction of other possible failures and the various other modes of operation of the embodiment of the microwave power amplifier network according to this invention, as shown in FIG. 3, will be summarized in tabular form hereinafter. Accordingly, if it is now assumed that the regular microwave power amplifier means $HPA_1$ has failed while the standby microwave power amplifier means $HPA_2$ and the regular and standby television and telephony signal transmitters remain properly operative, the switch means 1, 2, 8, 17 and 19 will be switched to their second state wherein the signal paths indicated by the dashed lines are enabled while the remainder of the switch means present in the FIG. 3 embodiment, i.e., 7, 11 and 16, may be considered to remain in a first state wherein the signal paths therein indicated by the solid lines will be enabled. As was stated above, the switch means 1, 2, 7, 8, 11, 16, 17 and 19 may be hand actuated or automatically responsive to the condition detected. Furthermore, the monitoring means for detecting the various conditions of failure may take any known form and as such monitoring means form no part of this invention they are not shown in FIG. 3 and will not be further discussed herein.

Under the conditions stated in the preceding paragraph, the switch means 1, 2 and 8 present within the dashed block A are in their second state, wherein the signal paths indicated by the dashed lines are enabled, while the switch means 7 therein is in its first state wherein the signal paths indicated by the solid lines are enabled. As this is the same condition of the switch means 1, 2, 7 and 8 described above for the exemplary failure condition of the embodiment of this invention illustrated in FIG. 2, it will be recalled that when these conditions obtain, standby television signals will be applied by the first output of the switch means 7 to the conductor 38 and combined regular television and telephony signals will be applied at the first output of the switch means 8 from the hybrid circuit means 5 to the conductor 39. Furthermore, it will be recalled that the standby television signals thus applied to the conductor 38 will be at the same power level as each of regular television and telephony signals present on conductor 39 because the variable attenuator means 9 enclosed within the dashed block A is set to attenuate the standby television signals passing therethrough by an amount equal to the insertion loss of the hybrid circuit means 5.

The standby television signals present on the conductor 38 are applied to the first input of the switch means 11 which is connected thereto, while the combined regular television and telephony signals applied to the conductor 39 are conveyed to the second input of the switch means 11 connected thereto. Since the switch means 11, under the conditions stated above, is in a first state wherein the signal paths indicated by the solid lines are enabled, the standby television signals present on conductor 38 will be conveyed thereby to the conductor 41 while the combined regular television and telephony signals present on conductor 39 will be applied by said switch means 11 to the conductor 42 connected to the second output thereof. Although the application of standby television signals to the conductor 41 and combined regular television and telephony signals to the conductor 42 has here been realized under the conditions stated above with the switch means 8 in a second state and the switch means 7 and 11 in a first state, it should be appreciated that as the switch means 11 is effectively a reversing switch, the same results could also be obtained if the switch means 8 was placed in the second state while switch means 7 and 11 were placed in a first state.

The standby television signals thus applied to the conductor means 41 by the first output of the switch means 11 are coupled to the input of the regular microwave power amplifier means $HPA_1$ which, under the conditions stated above, is in a failed condition. However, as the standby television signals applied to the input of the regular microwave power amplifier means $HPA_1$ are not, under the conditions specified above, to be further transmitted, such standby television signals may be monitored at the output of the regular microwave power amplifier means $HPA_1$, upon the return thereof to a normal operating condition, so that detection of a resumption of the proper functioning of said first microwave power amplifier means $HPA_1$ may be accomplished in accordance with the objectives of the present invention. The combined regular television and telephony signals applied to the conductor 42 by the second output of the switch means 11 are conveyed thereby to the input of the standby microwave power amplifier means $HPA_2$. The standby microwave power amplifier means $HPA_2$ acts on the combined regular television and telephony signals thus applied thereto to amplify such combined signals to an appropriate power level and thereafter applies such amplified, combined regular television signals to the first input of the switch means 17. The switch means 17 under the foregoing conditions is in a second state wherein the signal paths therein indicated by the dashed lines are enabled so that the first input of said switch means is connected to the second output thereof and the terminated second input thereto is connected to the conductor 47. As the switch means 17 is thus in a second state, the conductor 44 is connected to the conductor 45 therethrough so that the combined regular television and telephony signals applied to the first input of the switch means 17 are conveyed thereby through the conductor 45 to the second input of the switch means 16. The switch means 16, under the conditions stated above, has been retained in a first state wherein the signal paths therein indicated by the solid lines have been enabled. Accordingly, the suitably amplified, combined television and telephony signals applied over conductor 45 to the second input of the switch means 16 are conveyed thereby to the second input of the switch means 19 through conductor 48. The switch means 19, as stated above, is in a second condition and hence the signal paths therein indicated by the dashed lines are enabled. Therefore, the first output of the hybrid mixer means 18 coupled to the switch means 19 over the conductor 49 is connected to the dummy load $R_4$ while the suitably amplified, combined television and telephony signals applied to the second input thereof by the conductor 48 are conveyed thereby to the conductor 50 and hence to the transmitting antenna means 20 for transmission.

Thus, it will be seen that under the condition of failure specified above, wherein the regular microwave power amplifier means $HPA_1$ has failed while the standby microwave power amplifier means $HPA_2$ and the regular television and telephony transmitters remain in normal operation, the mode of operation of the embodiment of this invention illustrated in FIG. 3 is changed by the selective modification of the states of the switch means therein so that the standby microwave power amplifier means $HPA_2$ no longer acts individually upon only telephony or television signals, but receives both regular telephony and television signals in combination and appropriately amplifies such combined regular telephony and television signals to a suitable power level. Thereafter, such suitably amplified, combined regular telephony and television signals are applied through suitable signal paths, provided by certain ones of the switch means therein to the transmitting antenna means 20. Thus, under these conditions intermodulation noise is no greater than in conventional microwave power amplifier means and is markedly reduced when the condition of failure is corrected. Furthermore, as was described above, when said regular microwave power amplifier means $HPA_1$ has failed, television signals which are not to be further transmitted are supplied to the input thereof so that when the condition of failure is corrected, such television signals which are not to be further transmitted may be utilized for the monitoring and detection of the corrected condition.

The two modes of operation of the embodiment of this invention illustrated in FIG. 3, set forth in detail above, served to illustrate the case where the operation of the regular and standby microwave power amplifier means $HPA_1$ and $HPA_2$ and the regular television and telephony signal transmitters were normal and the case in which only the regular microwave power amplifier means $HPA_1$ had failed. These cases were selected for explanation because the initial case is by far the most common condition to occur and admirably serves to demonstrate certain of the attributes of the present invention, while the second case is the type of failure with which the prior art was most concerned. As will be obvious to those of ordinary skill in the art, a plurality of other conditions of failure may occur in microwave power amplifier networks and in addition thereto, the embodiment of the microwave power amplifier network according to this invention, as illustrated in FIG. 3, allows, due to the various switch means provided therein, a plurality of alternative modes of operation. The various modes of operation of the microwave power amplifier network illustrated in FIG. 3 are summarized below in Tables II and III, wherein Table II indicates the various conditions of failure and the remedies available therefore together with the variable modes of operation enabled by the switch means 1, 2, 7, 8 and 11 while Table III summarizes the various switch settings of the switch means 16, 17 and 19 under conditions where the regular and/or standby microwave amplifier means $HPA_1$ and/or $HPA_2$ are acting individually or in combination. In Tables II and III the symbols utilized are those adapted above.

TABLE II

| | HAP | | Switch | | | | | |
|---|---|---|---|---|---|---|---|---|
| Constituent | 1 | 2 | 1 | 2 | 7 | 8 | 11 | Remarks |
| State: | | | | | | | | |
| a | N | N | SL | SL | SL | SL | SL | To remedy both of TP and TV. |
| b | N | N | SL | SL | SL | SL | DL | |
| c | N | F | DL | DL | DL | * | SL | |
| d | F | N | DL | DL | * | DL | SL | |
| e | N | F | DL | DL | * | DL | DL | |
| f | F | N | DL | DL | DL | * | DL | |
| g | N | F | * | SL | * | SL | DL | To remedy only TP. |
| h | F | N | * | SL | * | SL | SL | |
| i | N | F | SL | * | SL | * | SL | To remedy only TV. |
| j | F | N | SL | * | SL | * | DL | |
| k | N | N | DL | DL | SL | SL | SL | Both regular TV and TP have failed. |
| l | N | N | DL | DL | SL | SL | DL | |
| m | N | F | SL | SL | DL | * | SL | |
| n | N | F | SL | SL | * | DL | DL | |
| o | F | N | SL | SL | * | DL | SL | |
| p | F | N | SL | SL | DL | * | DL | |
| q | N | N | DL | SL | SL | SL | SL | Regular TV has failed. |
| r | N | N | DL | SL | SL | SL | DL | |
| s | N | F | SL | DL | DL | * | SL | |
| t | N | F | SL | DL | * | DL | DL | |
| u | F | N | SL | DL | * | DL | SL | |
| v | F | N | SL | DL | DL | * | DL | |
| w | N | N | SL | DL | SL | SL | SL | Regular TP has failed. |
| x | N | N | SL | DL | SL | SL | DL | |
| y | N | F | DL | SL | DL | * | SL | |
| z | N | F | DL | SL | * | DL | DL | |
| $z_1$ | F | N | DL | SL | * | DL | SL | |
| $z_2$ | F | N | DL | SL | DL | * | DL | |

TABLE III

| | HPA | | Switch | | | |
|---|---|---|---|---|---|---|
| Constituent | 1 | 2 | 16 | 17 | 19 | Remarks |
| State: | | | | | | |
| a | N | N | SL | SL | SL | Individual amplification. |
| b | N | N | DL | SL | DL | $HPA_2$ used in single amplification. |
| c | N | N | DL | SL | DL | $HPA_1$ used in single amplification. |
| d | N | F | DL | SL | DL | All cases of single, individual, and common amplification. |
| e | F | N | SL | DL | DL | |

Under each of the conditions summarized above, it will be appreciated that whenever both the regular and standby microwave power amplifier means $HPA_1$ and $HPA_2$ are operating properly, each of said power amplifier means is utilized separately to act individually upon one type of signal to thus achieve a marked reduction in intermodulation noise and maximum power utilization. In addition, whenever a failure occurs in either the regular or standby microwave power amplifier means $HPA_1$ or $HPA_2$, the microwave power amplifier means $HPA_1$ or $HPA_2$, which remains in a normal operating condition, is caused to act in a common amplifying mode. Further, signals which are not to be further transmitted are applied, assuming the correct switch settings therefore, to the input of the microwave amplifier means in which a failure has occurred so that the return thereof to a normal operating condition may be determined by monitoring means located at the outputs thereof. In the FIG. 3 embodiment of the present invention, the variable attenuator means 9 and 10 were used to equalize the insertion loss of the hybrid circuit means 5 in the same manner as was done in the microwave power amplifier network illustrated in FIG. 2. However, as the hybrid mixer means 18 also exhibits a clearly defined insertion loss and is operative, due to the switch means 16 and 17, to combine only television and telephony signals which have not been previously combined by hybrid circuit means 5, the insertion loss of the hybrid mixer means 18 may be utilized to compensate signals not passed through the hybrid circuit means 5. Accordingly, in embodiments of this invention wherein it is not desired to have a mode of operation where telephony or television signals only are individually supplied to the transmitting antenna means 20, the variable attenuator means 9 and 10 may be omitted and the insertion loss of the hybrid mixer means 18 substituted therefore. Furthermore, it should be noted that the input portion of the embodiment of the microwave power amplifier network illustrated in FIG. 3 is provided with the switch means 11 which acts in the role of a reversing switch. Therefore, a form of hot standby arrangement is present in the embodiment of this invention depicted in FIG. 3, wherein the regular and standby microwave power amplifier means $HPA_1$ and $HPA_2$ may serve as regular and standby amplifier means without incurring the 3 db. loss normally associated with the single amplification which takes place in conventional microwave power amplifier networks.

Figure 4:
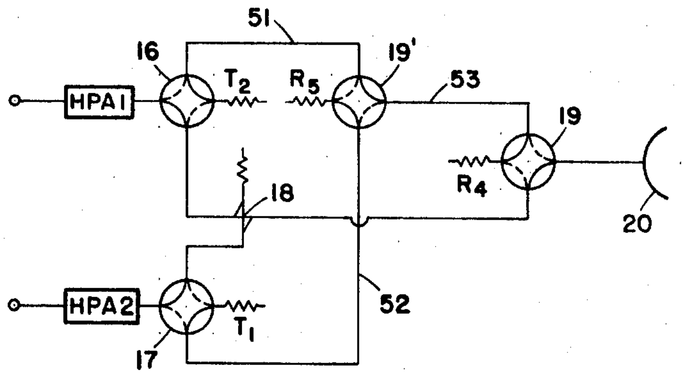
FIG. 4 is a block diagram depicting the pertinent portions of another embodiment of a microwave power amplifier network according to the present invention.
Figure 5:
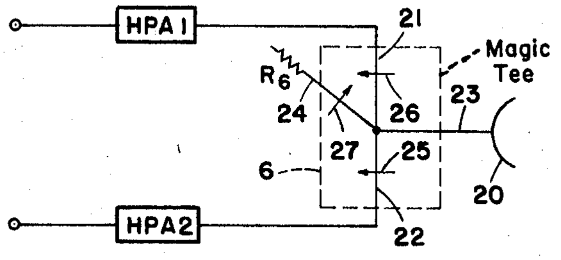
FIG. 5 is a block diagram illustrating the pertinent portions of yet another embodiment of a microwave power amplifier network according to the present invention.

FIG. 4 is a block diagram which illustrates the pertinent portions of another embodiment of a microwave power amplifier network according to the present invention and more particularly a modification to the output portion of the embodiment of the microwave power amplifier network shown in FIG. 5. In the embodiment of this invention shown in FIG. 4, the output portion of the microwave power amplifier network illustrated in FIG. 3 has been modified so that an additional switch means 19′ is interposed between the second outputs of the switch means 17 and 16 and the second input to the switch means 19. The switch means 19′ may take the form of any of the switch means previously described above and accordingly has four discrete signal paths therein as indicated by the solid and dashed lines shown in FIG. 4. The first input of the switch means 19′ is connected to the second output of the switch means 19 through the conductor 51, while the second input thereof is connected over conductor 52 to the second output of the switch means 17. The first output of the switch means 19′ is connected to the second input of the switch means 19 through conductor 53, while the second output of the switch means 19′ is terminated in the dummy load $R_5$. In addition, to compensate for the insertion of the switch means 19′, the second input to the switch means 16 has been terminated at $T_2$. The modified output portion, shown in FIG. 4, of the microwave power amplifier network illustrated in FIG. 3 is advantageous when it is desired that the microwave power amplifier network according to this invention have the capability of simultaneously terminating output power from the regular and standby microwave power amplifier means $HPA_1$ and $HPA_2$ without reflection. This can be done in the embodiment of this invention, of which a portion is shown in FIG. 4, by applying the outputs of one of said regular or standby microwave power amplifier means to the dummy load $R_5$ connected to the switch means 19′ while the output of the other of said microwave power amplifier means $HPA_1$ or $HPA_2$ is applied to the dummy load $R_4$ connected to the second output of the switch means 19. As will be obvious to those of ordinary skill in the art, the output arrangement illustrated in FIG. 4 is advantageous for the repair of microwave power amplifier networks while transmission is interrupted.

FIG. 5 is a block diagram illustrating the pertinent portions of another embodiment of a microwave power amplifier network according to the present invention and more particularly to a modification of the output portion of the embodiment of this invention shown in FIG. 3. In the embodiment of this invention illustrated in FIG. 5 magic tee means, indicated by the dashed block 6, has been substituted for the output portion of the embodiment of the microwave power network shown in FIG. 3 which was formed by the switch means 16, 17 and 19. The magic tee means 6 may take any conventional form of such devices which act in the well-known manner to provide at each of the collinear output arms thereof energy applied to either or both of the series and shunt input arms thereof. The regular and standby microwave power amplifier means $HPA_1$ and $HPA_2$ are connected to two equivalent input arms 21 and 22, respectively, of the magic tee means 6 while the output arms 23 and 24 thereof are connected to the transmitting antenna means 20 and the dummy load $R_6$. In addition, shutter means 25 and 26 are provided between the junction of the magic tee means 6 and the ends of the equivalent input arms 21 and 22, respectively, while shutter means 27 is provided between the junction of the magic tee means 6 and the dummy load $R_6$. The shutter means 25—27 are each disposed at appropriate electrical lengths within their respective arms of the magic tee means 6 so that, when each of the shutters 25—27 is open, and input signals are applied to the equivalent input arms 21 and 22, respectively, of the magic tee means 6, each of the equivalent input arms 21 and 22 remains isolated from the other input arm 21 or 22 to which such input signals are applied and such input signals are combined by said magic tee means 6 and coupled equally to the output arms 23 and 24 whereby equal power losses to each of the respective input signals occurs at the dummy load $R_6$ and the portions of said input signals thus combined and applied to the output arm 23 are applied to the transmitting antenna means 20. However, if the shutter means 25 and 27 are shorted while the shutter 26 is left in an open condition, input signals applied to the input arm 21 will be coupled without loss or reflection to the output arm 23 and hence to the transmitting antenna means 20 while input signals which might be applied to the input arm 22 will not be propagated to the output arm 23. Conversely, if the shutter means 26 and 27 are shorted while the shutter 25 is left in an open condition, input signals applied to the input arm 22 will be coupled without loss or reflection to the output arm 23 while any input signals which might be applied to the input arm 21 are not conveyed to the output arm 23. Thus, it will be seen that the magic tee means 6 is effectively utilized as a coupler in the embodiment of the invention illustrated in FIG. 5. Therefore, although the magic tee means 6, which exhibits a 3 db. loss, has been illustrated in FIG. 5, it will be obvious to those of ordinary skill in the art that any suitable microwave coupling means may be substituted therefore. In considering the operation of the embodiment of this invention of which the pertinent output portion thereof is illustrated in FIG. 5, three distinct types of operation must be considered. The first such type of operation is where the regular and standby microwave amplifier means $HPA_1$ and $HPA_2$ are each operating normally and, accordingly, first and second input signals are being applied thereby to the equivalent input arms 21 and 22, respectively, of the magic tee means 6 connected thereto. Under these conditions, the shutter means 25—27 will each be in an open condition so that the equivalent input arms 21 and 22 will each be isolated from the input signals applied to the other of said input arms 21 or 22 while the input signals applied thereto by the microwave amplifier means $HPA_1$ and $HPA_2$ are equally applied to each of the output arms 23 and 24. Thus, under these conditions, equal power loss to each of the respective input signals will occur across the dummy load $R_6$ connected to the output arm 24 while the portions of said input signals applied to the output 23 will be coupled to the transmitting antenna means 20 connected thereto.

The second type of operation which must be distinguished is where a failure has occurred in the regular microwave power amplifier means $HPA_1$ and thus, as explained in conjunction with FIG. 3, television and telephony signals are commonly amplified by the standby microwave power amplifier means $HPA_2$ and applied to input arm 22 of the magic tee means 6. When these conditions obtain, the shutter means 26 and 27 are in a shorted condition while the shutter means 25 is retained in the open conditions. Accordingly, under this set of conditions, the combined television and telephony signals applied to the input arm 22 of the magic tee means 6 are coupled directly to the output arm 23 thereof without loss or reflection. Thus, such combined television and telephony signals as are applied to the input arm 22 of the magic tee means 6 by the standby microwave power amplifier means $HPA_2$, under these conditions, are applied directly to the transmitting antenna means 20.

The third type of operation which should be considered is where a failure has occurred in the standby microwave power amplifier means $HPA_2$ whereby television and telephony signals will be commonly applied and amplified by the regular microwave power amplifier means $HPA_1$ and thereafter conveyed by said regular microwave power amplifier means $HPA_1$ to the input arm 21 of the magic tee means 6. Under these conditions, the shutter means 25 and 27 are placed in a shorted condition and the shutter means 26 is placed in the open condition. Thus, in a similar manner to the second case of operation discussed directly above, the suitably amplified, combined television and telephony signals applied to the input arm 21 of the magic tee means 6 are coupled directly to the output arm 23 thereof, without loss or reflection, while the input arm 22 is uncoupled from the output arm 23. Accordingly, the combined television and telephony signals applied to the input arm 21 of the magic tee means 6 by the regular microwave power amplifier means $HPA_1$, under the conditions set forth above, are coupled directly to the transmitting antenna means 20 connected to the output arm 23 of the magic tee means 6.

The various conditions of failure as well as the various modes of operation of the microwave amplifier network according to the present invention pertaining to the pertinent portions thereof described in conjunction with FIG. 5, are summarized below in Table IV together with the respective conditions of the shutter means 25—27 as are necessary to correct such conditions of failure or to enable said various modes of operation. In Table IV the symbolic designations of the conditions of the regular and standby microwave amplifier means $HPA_1$ and $HPA_2$ adopted above have been retained and the letter designations O and SH have been utilized to indicate an open and shorted condition, respectively, of the shutter means 25—27.

TABLE IV

| | HPA | | Switch | | | |
|---|---|---|---|---|---|---|
| Constituent | 1 | 2 | 25 | 26 | 27 | Remarks |
| State: | | | | | | |
| a | N | N | O | O | O | Individual amplification. |
| b | N | N | O | SH | SH | $HPA_2$ used in single amplification. |
| c | N | N | SH | O | SH | $HPA_1$ used in single amplification. |
| d | N | F | SH | O | SH | All cases of single, individual, and |
| e | F | N | O | SH | SH | common amplification. |

Thus, it is seen that the embodiment of this invention described in conjunction with FIG. 5 appropriately substitutes microwave coupling means, which here takes the form of magic tee means 6, for the switch 16, 17 and 19 relied upon in the microwave power amplifier network according to this invention as shown in FIG. 3.

Therefore, it will be appreciated that the microwave power amplifier network according to the present invention enables the large amounts of power required in communication systems to be supplied to the transmitting antenna means thereof on a substantially continuous basis without wasting the equivalent quantities of power normally held in reserve and used only on a standby basis in conventional microwave power amplifier networks adapted for this purpose. Additionally, when no failure has occurred in the microwave power amplifier means according to this invention, intermodulation noise is maintained at a relatively low level. Furthermore, the microwave power amplifier networks according to the present invention enable a plurality of conditions of failure to be corrected as well as widely ranging modes of operation to be selected by the utilization of switching arrangements therein which act in a positive, fail-safe manner. In addition, as was described above, whenever one of the microwave power amplifier means present in the microwave power amplifier networks of the present invention fails, television or telephony signals which are not to be further transmitted are applied thereto so that upon the return of said one microwave power amplifier means to a normal operating condition, such television or telephony signals may be utilized to detect the reestablishment of normal operations therein.

Although rather specific exemplary embodiments of the present invention have been described herein so that the character of the microwave power amplifier networks according to the instant invention may be fully appreciated, the invention as herein disclosed will admit of a plurality of modifications which will be obvious to those of ordinary skill in the art. Thus, for instance, even though the subject invention was disclosed wherein television and telephony signals are applied to the microwave power amplifier network, it will be apparent that any two signals may be applied thereto and that the description of this invention set forth above will be fully applicable in specie thereto if the letter designations A and B are applied to such two signals respectively and A is substituted for the word television and B is substituted for the word telephony wherever they appear herein. In addition, although the description of this invention was directed to microwave power amplifier networks having the capability of confirming the return from a condition of failure of each of the regular and standby microwave power amplifier means $HPA_1$ and $HPA_2$; if this capability is not necessary, the apparatus included in the switching arrangements present in the microwave power amplifier networks according to this invention can be substantially reduced. Accordingly, if the FIG. 3 embodiment of this invention is considered, under conditions wherein the foregoing capability is unnecessary, it will be appreciated that switch means 1 and 2 may be omitted as it is now only required that the respective signals applied to said switch means 1 and 2 by directly applied to the switch means 7 and 8 or the hybrid circuit means 5, etc.

While this invention has been described in connection with several exemplary embodiments thereof, it will be understood that many modifications will be readily apparent to those of ordinary skill in the art; thus, this application should in no way be considered as limited to the specific apparatus shown and/or described.

We claim:

1. A microwave power amplifier network comprising:

first and second microwave power amplifier means exhibiting a sufficient bandwidth to accommodate first and second multiplexed signals;

input circuit means including first and second switch means adapted to separately apply said first multiplexed signals to one of said microwave power amplifier means and said second multiplexed signals to another of said microwave power amplifier means, said first and second switch means each including first and second input means, at least one output means, and means for selectively connecting said first and second input means to said at least one output means, said first input means of said first switch means being adapted to receive said first multiplexed signals, said first input means of said second switch means being adapted to receive said second multiplexed signals and said at least one output means of each of said first and second switch means being connected to individual ones of said first and second microwave power amplifier means by connector means adapted therefore;

means for applying each of said first and second multiplexed signals to one of said first and second microwave power amplifier means in response to the detection of a failure in the other one of said microwave power amplifier means, said means for applying each of said first and second multiplexed signals to one of said first and second microwave power amplifier means including means for combining said first and second multiplexed signals and means for connecting said second input means of each of said first and second switch means to said means for combining said first and second multiplexed signals; and means for selectively applying output signals from said first and second microwave power amplifier means to transmitting antenna means, said means for selectively applying output signals including means for selectively applying output signals from only one of said first and second microwave power amplifier means to said transmitting antenna means and means for selectively applying combined output signals from each of said first and second microwave power amplifier means to said transmitting antenna means.

2. The microwave power amplifier network according to claim 1 wherein said means for selectively applying combined output signals from each of said first and second microwave power amplifier means to said transmitting antenna means includes hybrid circuit means operative to combine output signals from said first and second microwave power amplifier means as applied thereto and to apply said output signals to said transmitting antenna means.

3. The microwave power amplifier network according to claim 2 wherein said hybrid circuit means comprises magic tee means including first and second input arms and first and second output arms, said first and second input arms being coupled to said first and second microwave power amplifier means respectively, and one of said first and second output arms being coupled to said transmitting antenna means.

4. The microwave power amplifier network according to claim 3 wherein shutter means are provided in each of said first and second input arms of said magic tee means and in the output arm thereof which is not coupled to said transmitting antenna, said shutter means being adapted to be selectively placed in opened and shorted conditions whereupon said magic tee means may be selectively placed in a first condition wherein combined output signals from each of said first and second microwave power amplifier means are applied to said transmitting antenna means and a second condition wherein output signals from only one of said first and second microwave power amplifier means is applied to said transmitting antenna means.

5. The microwave power amplifier network according to claim 2 additionally comprising sixth and seventh switch means, said sixth and seventh switch means each including at least one input means, first and second output means and means for selectively connecting said first and second output means to said at least one input means; said at least one input means of said sixth switch means being connected to said first microwave power amplifier means, said at least one input means of said seventh switch means being connected to said second microwave power amplifier means; and said first output means of each of said sixth and seventh switch means being connected as inputs to said hybrid circuit means.

6. The microwave power amplifier network according to claim 5 additionally comprising eighth switch means including first and second input means, at least one output means, and means for selectively connecting said at least one output means to said first and second input means; said at least one output means of said eighth switch means being connected to said transmitting antenna means and said first input means of said eighth switch means being connected to said hybrid circuit means at an output thereof.

7. The microwave power amplifier network according to claim 6 wherein said sixth switch means includes an additional input means and additionally comprising means for connecting said second output means of said seventh switch means to said additional input means of said sixth switch means and means for connecting said second output of said sixth switch means to said second input means of said eighth switch means.

8. The microwave power amplifier network according to claim 6 additionally comprising:

ninth switch means including first and second input means, at least one output means and means for selectively connecting said first and second input means to said at least one output means;

means for connecting said second output means of said sixth and seventh switch means to the first and second input means, respectively, of said ninth switch means; and means for connecting said at least one output means of said ninth switch means to said second input of said eighth switch means.

9. The microwave power amplifier network according to claim 2 wherein said input circuit means includes third and fourth switch means, said third and fourth switch means each including at least one input means, first and second output means and means for selectively connecting said at least one input means to said first and second output means.

10. The microwave power amplifier network according to claim 9 wherein said at least one input means of said third switch means is adapted to receive said first multiplexed signals, said at least one input means of said fourth switch means is adapted to receive said second multiplexed signals, said first output means of said third switch means is connected to said first input means of said first switch means, said first output means of said fourth switch means is connected to said first input means of said second switch means and said second output means of each of said third and fourth switch means is connected as inputs to said means for combining said first and second multiplexed signals.

11. The microwave power amplifier network according to claim 2 wherein said connector means includes fifth switch means for selectively connecting said at least one output means of said first switch means to said first microwave power amplifier means and said at least one output means of said second switch means to said second microwave power amplifier means when said fifth switch means is in a first state and for selectively connecting said at least one output means of said first switch means to said second microwave power amplifier means and said at least one output means of said second switch means to said first microwave power amplifier means when said fifth switch means is in a second state.